United States Patent
Sokolov et al.

(10) Patent No.: US 7,096,466 B2
(45) Date of Patent: Aug. 22, 2006

(54) LOADING ATTRIBUTE FOR PARTIAL LOADING OF CLASS FILES INTO VIRTUAL MACHINES

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 535 days.

(21) Appl. No.: 09/818,096

(22) Filed: Mar. 26, 2001

(65) Prior Publication Data
US 2002/0138667 A1 Sep. 26, 2002

(51) Int. Cl.
G06F 9/44 (2006.01)
G06F 9/46 (2006.01)

(52) U.S. Cl. .......................... 718/1; 718/100; 718/102; 712/206

(58) Field of Classification Search ........ 718/100–102, 718/103–104, 1; 712/208, 213
See application file for complete search history.

(56) References Cited

U.S. PATENT DOCUMENTS

| | | | |
|---|---|---|---|
| 4,086,626 A | 4/1978 | Chung | |
| 4,199,811 A | 4/1980 | Borgerson et al. | |
| 4,667,290 A | 5/1987 | Goss et al. | |
| 4,910,731 A * | 3/1990 | Sakurai et al. | 370/413 |
| 5,418,964 A * | 5/1995 | Conner et al. | 719/316 |
| 5,815,718 A | 9/1998 | Tock | |
| 5,838,980 A | 11/1998 | Guillen et al. | |
| 5,848,274 A | 12/1998 | Hamby et al. | |
| 5,872,978 A | 2/1999 | Hoskins | |
| 5,878,430 A * | 3/1999 | Lafuse | 707/103 R |
| 5,893,084 A | 4/1999 | Morgan et al. | |
| 5,893,118 A | 4/1999 | Sonderegger | |
| 5,899,997 A * | 5/1999 | Ellacott | 707/103 R |
| 5,903,761 A | 5/1999 | Tyma | |
| 5,920,720 A | 7/1999 | Toutonghi et al. | |
| 5,970,242 A | 10/1999 | O'Connor et al. | |
| 5,978,585 A | 11/1999 | Crelier | |
| 6,003,038 A | 12/1999 | Chen | |
| 6,026,237 A * | 2/2000 | Berry et al. | 717/130 |
| 6,026,485 A | 2/2000 | O'Connor et al. | |
| 6,047,125 A | 4/2000 | Agesen et al. | |
| 6,061,743 A | 5/2000 | Thatcher et al. | |

(Continued)

FOREIGN PATENT DOCUMENTS

EP 0810522 A2 12/1997

(Continued)

OTHER PUBLICATIONS

Robert Griesemer, entitled "Utilizing a Program Counter With One or More Data Counters for Executing Instructions," U.S. Appl. No. 09/107,939, filed Jun. 30, 1998.

(Continued)

Primary Examiner—Meng-Al T. An
Assistant Examiner—Syed J Ali
(74) Attorney, Agent, or Firm—Beyer Weaver & Thomas, LLP

(57) ABSTRACT

Improved techniques for loading class files into virtual computing machines are disclosed. The techniques seek to provide a mechanism that will generally improve the efficiency of virtual machines by selectively loading information into a virtual machine. A new class attribute ("load-attribute") is defined and implemented for class files. This can be, for example, implemented as a "load-attribute" table that lists the components that have been selected for loading into the virtual machine. In addition, the load-attribute may provide references to the selected components in the class file. Accordingly, various components of the class file can be marked for loading and selectively loaded.

17 Claims, 6 Drawing Sheets

U.S. PATENT DOCUMENTS

| | | | |
|---|---|---|---|
| 6,072,951 A | 6/2000 | Donovan et al. | |
| 6,072,953 A * | 6/2000 | Cohen et al. | 717/166 |
| 6,081,665 A | 6/2000 | Nilsen et al. | |
| 6,083,279 A | 7/2000 | Cuomo et al. | |
| 6,096,095 A | 8/2000 | Halstead | |
| 6,101,580 A | 8/2000 | Agesen et al. | |
| 6,118,940 A | 9/2000 | Alexander, III et al. | |
| 6,151,618 A | 11/2000 | Wahbe et al. | |
| 6,151,703 A * | 11/2000 | Crelier | 717/136 |
| 6,158,048 A | 12/2000 | Lueh et al. | |
| 6,163,780 A | 12/2000 | Ross | |
| 6,182,202 B1 | 1/2001 | Muthukkaruppan | |
| 6,202,208 B1 | 3/2001 | Holiday, Jr. | |
| 6,205,578 B1 | 3/2001 | Grove | |
| 6,209,018 B1 | 3/2001 | Ben-Shachar et al. | |
| 6,223,202 B1 | 4/2001 | Bayeh | |
| 6,237,135 B1 | 5/2001 | Timbol | |
| 6,260,187 B1 | 7/2001 | Cirne | |
| 6,292,883 B1 | 9/2001 | Augusteijn et al. | |
| 6,295,638 B1 | 9/2001 | Brown et al. | |
| 6,317,872 B1 | 11/2001 | Gee et al. | |
| 6,324,685 B1 | 11/2001 | Balassanian | |
| 6,330,709 B1 * | 12/2001 | Johnson et al. | 717/100 |
| 6,332,215 B1 | 12/2001 | Patel et al. | |
| 6,336,213 B1 | 1/2002 | Beadle et al. | |
| 6,338,160 B1 | 1/2002 | Patel et al. | |
| 6,339,841 B1 * | 1/2002 | Merrick et al. | 717/166 |
| 6,349,377 B1 | 2/2002 | Lindwer | |
| 6,358,769 B1 | 3/2002 | Vigna et al. | |
| 6,372,286 B1 | 4/2002 | Azuma et al. | |
| 6,374,286 B1 | 4/2002 | Gee et al. | |
| 6,412,107 B1 | 6/2002 | Cyran et al. | |
| 6,412,108 B1 | 6/2002 | Blandy et al. | |
| 6,427,228 B1 | 7/2002 | Wigger | |
| 6,429,860 B1 | 8/2002 | Hughes | |
| 6,434,625 B1 | 8/2002 | Loen | |
| 6,434,694 B1 | 8/2002 | Slaughter et al. | |
| 6,442,558 B1 | 8/2002 | Brown et al. | |
| 6,442,753 B1 | 8/2002 | Gerard et al. | |
| 6,446,084 B1 | 9/2002 | Shaylor et al. | |
| 6,446,254 B1 | 9/2002 | Chapman et al. | |
| 6,453,342 B1 | 9/2002 | Himmel et al. | |
| 6,463,578 B1 | 10/2002 | Johnson | |
| 6,467,037 B1 | 10/2002 | Griesemer | |
| 6,477,702 B1 | 11/2002 | Yellin et al. | |
| 6,496,871 B1 | 12/2002 | Jagannathan et al. | |
| 6,510,551 B1 | 1/2003 | Miller | |
| 6,523,168 B1 | 2/2003 | Arnold et al. | |
| 6,553,565 B1 | 4/2003 | Click, Jr. et al. | |
| 6,557,023 B1 | 4/2003 | Taivalsaari | |
| 6,557,054 B1 | 4/2003 | Reisman | |
| 6,571,388 B1 | 5/2003 | Venkatraman et al. | |
| 6,581,077 B1 | 6/2003 | Sololov et al. | |
| 6,584,612 B1 | 6/2003 | Mueller et al. | |
| 6,643,711 B1 | 11/2003 | Bracha et al. | |
| 6,658,421 B1 | 12/2003 | Seshadri | |
| 6,658,573 B1 | 12/2003 | Bischof et al. | |
| 6,675,371 B1 | 1/2004 | York et al. | |
| 6,684,394 B1 | 1/2004 | Shann | |
| 6,704,746 B1 | 3/2004 | Sokolov et al. | |
| 6,704,803 B1 | 3/2004 | Wilson et al. | |
| 6,704,923 B1 | 3/2004 | Gosling | |
| 6,704,927 B1 | 3/2004 | Bak et al. | |
| 6,721,740 B1 | 4/2004 | Skinner et al. | |
| 6,738,977 B1 | 5/2004 | Berry et al. | |
| 6,742,109 B1 | 5/2004 | Sokolov et al. | |
| 6,769,015 B1 | 7/2004 | Bates et al. | |
| 6,851,108 B1 | 2/2005 | Syme et al. | |
| 6,851,111 B1 | 2/2005 | McGuire et al. | |
| 6,901,591 B1 * | 5/2005 | Sokolov | 718/1 |
| 6,978,456 B1 * | 12/2005 | Sokolov et al. | 718/1 |
| 6,996,813 B1 * | 2/2006 | Sokolov et al. | 717/148 |
| 7,020,874 B1 * | 3/2006 | Sokolov et al. | 717/166 |
| 2002/0046298 A1 | 4/2002 | Bak et al. | |
| 2002/0087589 A1 | 7/2002 | Wallman | |
| 2002/0170041 A1 | 11/2002 | Shann | |
| 2002/0170043 A1 | 11/2002 | Bagley et al. | |
| 2002/0188726 A1 * | 12/2002 | Schick et al. | 709/227 |
| 2004/0172619 A1 | 9/2004 | Woolen et al. | |

FOREIGN PATENT DOCUMENTS

| | | |
|---|---|---|
| EP | 0943989 A2 | 9/1999 |
| EP | 0 996 059 A | 4/2000 |
| EP | 1076301 A2 | 2/2001 |
| EP | 1124183 A1 | 8/2001 |
| WO | WO99/31576 | 6/1999 |
| WO | WO01/22213 A2 | 3/2001 |
| WO | WO02/41145 A2 | 5/2002 |
| WO | WO02/077807 A1 | 10/2002 |
| WO | WO03/104980 A2 | 12/2003 |

OTHER PUBLICATIONS

Pominville, Patrice, "Annotating Java Bytecode", 2000, Project Report, McGill University, pp. 1-7. XP-002254149.

Yourst, Matt T., "Inside Java Class Files", 1998, *Dr. Dobb's Journal*, pp. 46-52.

Hummel, Joseph et al., "Annotating the Java bytecodes in support of optimization", 1997, *Concurrency: Practice and Experience*, vol. 9, No. 11, pp. 1003-1016.

Lindholm, T. et al., "The Java Virtual Machine Specification—Second Edition", 1999, *Addison-Wesley*, pp. 117-132. XP-002254151.

Lambright H D, "Java Bytecode Optimizations" Proceedings of IEEE Compcon '97. San Jose, Feb. 23-26, 1997, pp. 206-210, XP-000751784.

Accomazzo E et al., "Integrating intermediate Code Optimization with Retargetable Code Generation" Microprocessing and Microprogramming, Elsevier Science Publishers, BV. Amsterdam, NL, vol. 30, No. 1/5, Aug. 1, 1990, pp. 475-481, XP000141684.

Tim Ritchey, "Java!" 1995, New Riders Publishing, p. 326-343.

Microsoft Press Computer Dictionary Third Edition, p. 294-295.

Piumarta et al., "Optimizing Direct Threaded Code by Selective Inlining," Association for Computing Machinery, vol. 33, No. 5, p. 291-300, May 1, 1998. XP-000766278.

Tommesani, "Programming models".

Goldberg, "A specification of java loading and bytecode verification," ACM, p. 49-58, 1998.

Chang et al. "Type based verification of assembly language for compiler degugging," ACM TLDI, p. 91-102, Jan. 2005.

Qian et al., "A formal specification of Java class loading," ACM OOPSLA, p. 325-336, 2000.

Krintz et al., "Reducing transfer delay using java class file splitting and prefetching," ACM OOPSLA, pp. 276-291 Nov. 1999.

Clausen et al., "Java Bytecode Compression for Low-End Embedded Systems," May 2000, ACM.

Chilimbi et al., "Cache-Conscious Structure Definition", p. 13-24, 1999 ACM.

Nicol et al., "Empirical Study of parallel Trace-Driven LRU Cache Simulators," p. 166-169, 1995 IEEE.

Office Actions dated Mar. 13, 2003, Jul. 31, 2003 and Feb. 5, 2004 respectively by Examiner Charles Rones for U.S. Appl. No. 09/852,463, entitled "Frameworks for Accessing Java Class Files."

Examination Report dated Aug. 2, 2005 from the corresponding EP Application No.:02813888.2-2211, 6 pages.

Case B: "Implementing The Java Virtual Machine *Java's Complex Instruction Set Can Be Built in Software or Hardware*," Microprocessor Report, vol. 10, No. 4, Mar. 25, 1996, pp. 12-17. XP-000987276.

McNeley KJ et al., "Emulating a Complex Instruction Set Computer With a Reduced Instruction Set Computer," IEEE Micro, IEEE Inc. New York, US, vol. 7, No. 1, Feb. 1987, pp. 60-71. XP-000827611.

Jean-Paul Billon, "JEFFWEG4 (J Executable File Format), Release 1.0 Achievements, Sep. 29, 2000," J Consortium Jeff Working Group, Online! Feb. 22, 2001, pp. 1-24. XP-002208358.

Jean-Paul Billon, "J Executable File Format (JEFF) Specification, Draft," J Consortium Jeff Working Group, 'Online! Feb. 22, 2001, p. 1-43. XP-002208357.

Chang et al., "EJVM: an economic Java run-time environment for embedded devices," Software Practice & Experience, 2001, John Wiley & Sons, Ltd., vol. 31, pp. 129-146. XP-000987539.

Gosling et al., "The Java™ Language Specification", Aug. 1, 1996, pp. 215-236. XP 002042923.

Zhenyu Qian, "A Formal Specification of Java™ Virtual Machine Instructions," Technical Report, University Bremen; Nov. 1997, pp. 1-32. XP-002255760.

Markus Dahm, "Byte Code Engineering" Freie University Berlin, 1999. XP-002262007.

Meyer et al., "Java Virtual Machine" O'Reilly & Associates, Inc., 1997. XP-002262008.

Bill Venners, "How the Java virtual machine handles method invocation and return" Java World, Jun. 1997, pp. 1-10.

Sun Microsystems: "Java Card 2.1.1 Virtual Machine Specification" May 18, 2000, XP002290969.

Info-Zip: "Info-Zip application note" Mar. 11, 1997, XP002290913.

TIS Committee: "Executable and linking format (ELF) specification" May 1995, XP002290914.

Prominville et al. "A framework for optimizing java using attributes", Proc. of the 2000 conf. of the center of advance studies on collaborative research, Nov. 2000, pp. 1-17.

Krintz et al. "Reducing transfer delay using java class file splitting and prefetching", ACM OOPSLA, pp. 276-291.

Kazi et al. "Techniques for obtaining high performance in java programs", ACM Computing Surveys, vol. 32, No. 3, Sep. 2000, pp. 213-240.

Benton et al. "Compiling standard ML to java bytecodes", ACM ICFP 1998, pp. 129-140.

Alpern et al., "Implementing Jalapeno in Java", ACM OOPSLA, pp. 314-324.

Stephenson et al. "A quantitative analysis of the performance impact of specialized bytecodes in Java", Proc. Of the 2004 conference of the enter for advance studies on collaborative Research, Oct. 2004, pp. 267-281.

Office Actions dated Jul. 13, 2004 and Mar. 3, 2005 respectively by Examiner Anil Khatri for U.S. Appl. No. 09/886,440, entitled "Customization of Java Runtime Environments."

Lindholm et al., "The Java Virtual Machine Specification", Sep. 1996.

* cited by examiner

```
ClassFile {
    u4 magic;
    u2 minor_version;
    us major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attributes_count];
}
```

Fig. 1

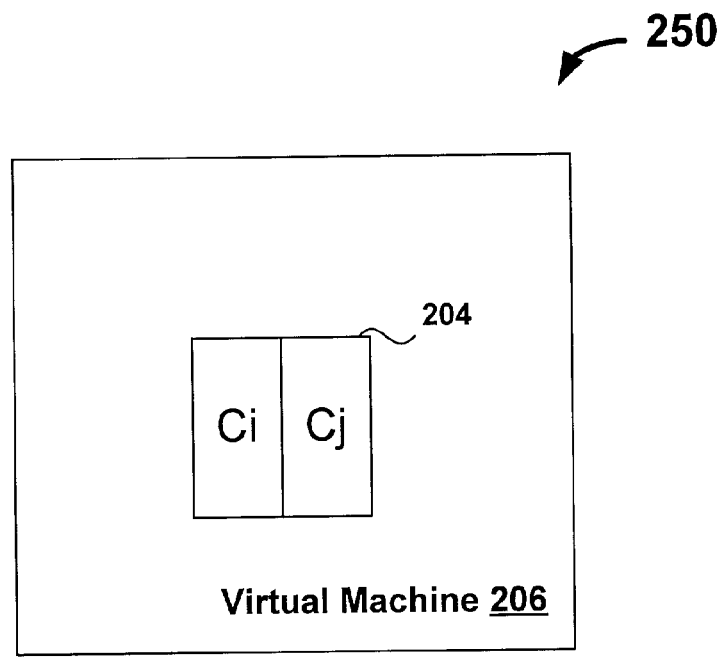
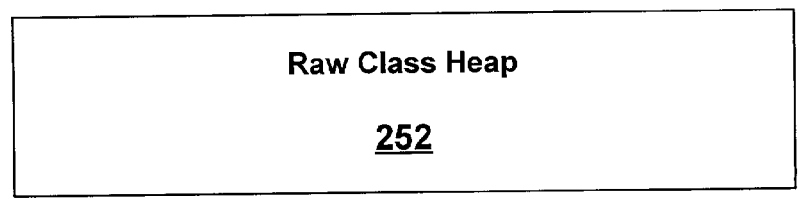
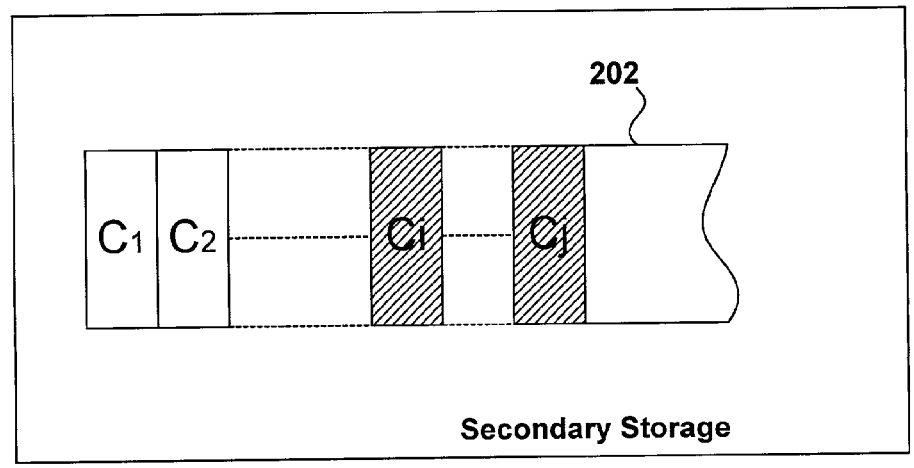
Fig. 2B

LOADING ATTRIBUTE FOR PARTIAL LOADING OF CLASS FILES INTO VIRTUAL MACHINES

CROSS-REFERENCE TO RELATED APPLICATIONS

This application is related to U.S. patent application Ser. No. 09/703,361, entitled "FRAMEWORKS FOR INVOKING METHODS IN VIRTUAL MACHINES," issued as U.S. Pat. No. 6,901,591, which is hereby incorporated by reference.

This application is related to U.S. patent application Ser. No. 09/703,356, entitled "METHODS AND APPARATUS FOR NUMERIC CONSTANT VALUE INLINING IN VIRTUAL MACHINES," issued as U.S. Pat. No. 6,978,456, which is hereby incorporated by reference.

This application is related to U.S. patent application Ser. No. 09/703,449, entitled "FRAMEWORKS FOR LOADING AND EXECUTION OF OBJECT-BASED PROGRAMS," issued as U.S. Pat. No. 6,996,813, which is hereby incorporated by reference.

This application is related to U.S. patent application Ser. No. 09/818,097, entitled "TECHNIQUES FOR LOADING CLASS FILES INTO VIRTUAL MACHINES," issued as U.S. Pat. No. 7,020,874, which is hereby incorporated by reference.

BACKGROUND OF THE INVENTION

1. The Field of the Invention

The present invention relates generally to object-oriented programming environments. More specifically, the invention relates to improved frameworks for loading class files into virtual computing machines.

2. The Relevant Art

The present invention relates generally to object-based high level programming environments, and more particularly, to virtual machine instruction sets suitable for execution in virtual machines operating in portable, platform independent programming environments.

Recently, the Java™ programming environment has become quite popular. The Java™ programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java™ runtime environment.

Computer programs in the Java programming language are arranged in one or more classes or interfaces (referred to herein jointly as classes or class files). Such programs are generally platform, i.e., hardware and operating system, independent. As such, these computer programs may be executed, without modification, on any computer that is able to run an implementation of the Java™ runtime environment.

Object-oriented classes written in the Java programming language are compiled to a particular binary format called the "class file format." The class file includes various components associated with a single class. These components can be, for example, methods and/or interfaces associated with the class. In addition, the class file format includes a significant amount of ancillary information that is associated with the class. FIG. 1A illustrates a class file structure. The class file format (as well as the general operation of the Java virtual machine) is described in some detail in *The Java Virtual Machine Specification* by Tim Lindholm and Frank Yellin (ISBN 0-201-31006-6), which is hereby incorporated herein by reference.

Generally, when a class file is loaded into the virtual machine, the virtual machine essentially makes a copy of the class file for its internal use. The virtual machine's internal copy is sometimes referred to as an "internal class representation." In conventional virtual machines, the internal class representation is typically almost an exact copy of the class file. This is true regardless of whether the loaded information is likely to be used or not. For example, typically, an exact copy of common Java classes (e.g., class PrintWriter) are loaded into the virtual machine. These common classes typically have a large size. For example, the class PrintWriter may take up as much as 40 KiloBytes (40 K) of memory. However, 90% of the common class is often not used during the execution of a computer program. This, of course, results in a grossly inefficient use of memory resources. In some circumstances, particularly in embedded systems with limited memory resources, this inefficient use of memory resources is a significant disadvantage.

In view of the foregoing, improved techniques for loading class files into virtual computing machines are needed.

SUMMARY OF THE INVENTION

To achieve the foregoing and other objects of the invention, improved techniques for loading class files into virtual computing machines are disclosed. One aspect of the present invention seeks to provide a mechanism that will generally improve the efficiency of virtual machines by selectively loading information into a virtual machine. In other words, unlike conventional techniques where the entire class file is substantially loaded into the virtual machine, the inventive techniques can operate to load only a portion of the class file. As will be appreciated, this allows a better use of the resources of the virtual machine. The inventive mechanisms are especially effective in virtual machines that operate with limited memory resources (e.g., embedded systems).

In accordance with the Java virtual machine specification, new class attributes can be defined for, and used by, Java virtual machine implementations. In one embodiment, a new class attribute ("load-attribute") is defined and implemented for class files. This can be, for example, implemented as a "load-attribute" table that lists components that have been selected for loading into the virtual machine. In addition, the load-attribute may provide references to the selected components in the class file. Accordingly, various components in the class file can be marked for loading and selectively loaded.

The invention can be implemented in numerous ways, including as a method, an apparatus, a computer readable medium, and a database system. Several embodiments of the invention are discussed below.

As a method for loading a class file into a virtual machine, one embodiment of the invention includes that acts of: determining whether one or more components of the class have been marked to be loaded into the virtual machine; and loading said one or more components of the class into the virtual machine when one or more components of the class file have been marked to be loaded into said virtual machine.

As a class file suitable for loading into a virtual machine, one embodiment of the invention includes a load attribute portion that provides information about one or more components of said class which have been marked to be loaded into said virtual machine.

As a computer readable medium including computer readable code for representing a class file suitable for loading into a virtual machine, one embodiment of the invention includes computer readable code representing a load attribute portion for said class file. The attribute portion lists one or more components of said class which have been marked to be loaded into said virtual machine.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates a class file structure.

FIG. 2B represents an object-oriented computing environment including a raw class heap in accordance with one embodiment of the invention.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to provide improved performance to Java compliant virtual machines. In order to be Java compliant, a virtual machine must be capable of working with Java classes which have a defined class file format. Although it is important that any Java virtual machine be capable of handling Java classes, the Java virtual machine specification does not dictate how such classes are represented internally within a particular Java virtual machine implementation. In addition, in accordance with the Java virtual machine specification, new class attributes can be defined for, and used by, Java virtual machine implementations.

The present invention pertains to improved frameworks for loading class files into virtual computing machines. One aspect of the present invention seeks to provide a mechanism that will generally improve the efficiency of virtual machines by selectively loading information into a virtual machine. In other words, unlike conventional techniques where the entire class file is substantially loaded into the virtual machine, the inventive techniques can operate to load only a selected portion of the class file. As will be appreciated, this allows for better use of the resources. Thus, the inventive mechanisms are especially effective in virtual machines that operate with limited memory resources (e.g., embedded systems).

In one embodiment, a new class attribute ("load-attribute") is defined and implemented for class files. This can be, for example, implemented as a "load-attribute" table that lists the components that have been selected for loading into the virtual machine. In addition, the load-attribute may provide references to the selected components in the class file. Accordingly, various components of the class file can be marked for loading and then selectively loaded.

Embodiments of the invention are discussed below with reference to FIGS. 2–5. However, those skilled in the art will readily appreciate that the detailed description given herein with respect to these figures is for explanatory purposes as the invention extends beyond these limited embodiments.

Figure 2A:
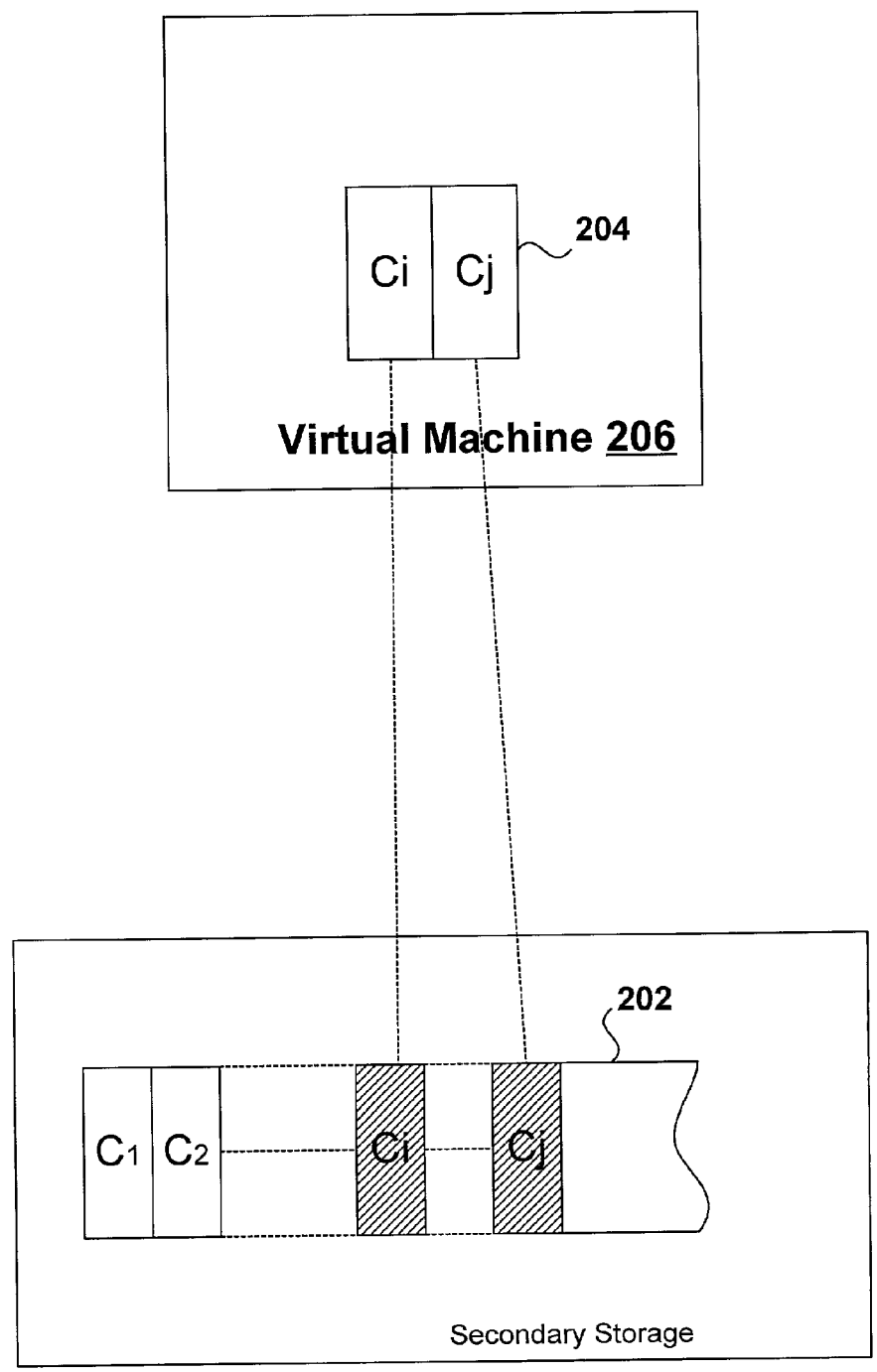
FIG. 2A is a representation of an object-oriented computing environment including a class file, and an internal class representation of the class file inside a virtual machine in accordance with one embodiment of the invention.

FIG. 2A is a representation of an object-oriented computing environment 200 including a class file 202, and an internal class representation 204 of the class file 202 inside a virtual machine 206 in accordance with one embodiment of the invention. The class file 202 typically resides in a secondary storage device outside the virtual machine 206. However, the class file 202 is represented as the internal class representation 204 inside the virtual machine 206.

As will be appreciated, various components of the class file 202, for example, components $C_i$ and $C_j$ of the class file 202 can be marked to indicate that these selected components are to be loaded into the virtual machine 206. The selected components $C_i$ and $C_j$ can, for example, represent the components of the class file that will be required at run time. Accordingly, only the marked components $C_i$ and $C_j$ of the class file 202 need to be loaded into the virtual machine 206. Thus, rather than representing the entire class file 202 inside the virtual machine 206, the internal representation 204 consists of only marked components $C_i$ and $C_j$. This allows for selective loading of class files and generally improves the efficiency of virtual machines, especially those with limited resources.

In addition, the present invention can be implemented in conjunction with a raw-class heap portion to further improve efficiency. FIG. 2B represents an object-oriented computing environment 250 including a raw class heap 252 in accordance with one embodiment of the invention. The raw-class heap portion 252 represents a portion of the memory of the object-oriented computing environment 250 that is used to initially load class files. This memory can be, for example, a memory portion of the object-oriented computing environment 252 that is dedicated to loading class files (i.e., dedicated memory). More details about the implementation of a raw class heap are disclosed in the related U.S. patent application Ser. No. 09/818,097, entitled "TECHNIQUES FOR LOADING CLASS FILES INTO VIRTUAL MACHINES," issued as U.S. Pat. No. 7,020,874.

Figure 3A:
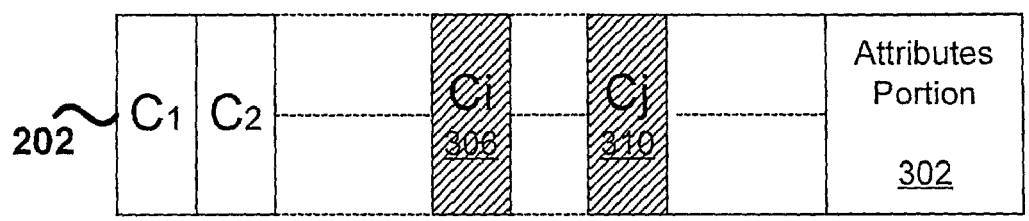
FIG. 3A illustrates a class file with one or more components marked in accordance with one embodiment of the invention.

As noted above, various components of the class file 202 can be marked for loading into the virtual machine. FIG. 3A illustrates a class file 202 with one or more components marked in accordance with one embodiment of the invention. Again, these marked components, can be, for example, components $C_i$ and $C_j$ of the class file 202. In the described embodiment, the class file 202 includes a class attributes portion 302. The class attributes portion 302 can be implemented to include the information relating to the marked components $C_i$ and $C_j$ of the class file 202. As will be appreciated, this can be achieved by defining a new class attribute since Java virtual machine implementations are allowed to define new attributes for class files. The new attribute can be defined in the "attributes" portion (table) of the class file structure shown in FIG. 1.

Accordingly, the class attributes portion 302 can be implemented in the attributes table of the class file 202 as a new attribute, for example, as a "load-attribute". As will be appreciated, this approach offers many advantages since Java virtual machines are permitted to recognize and use newly defined attributes found in the attributes tables of the class file structure. Thus, the invention can be implemented without requiring a tremendous amount of change to the existing virtual machine implementations. Furthermore, Java virtual machines are required to ignore the attributes that are not recognized. Thus, defining the "load-attribute" in the attributes portion of the class file 202 still allows the loading of the class file 202 in conventional virtual machines which do not recognize an attribute for loading of the components.

Figure 3B:
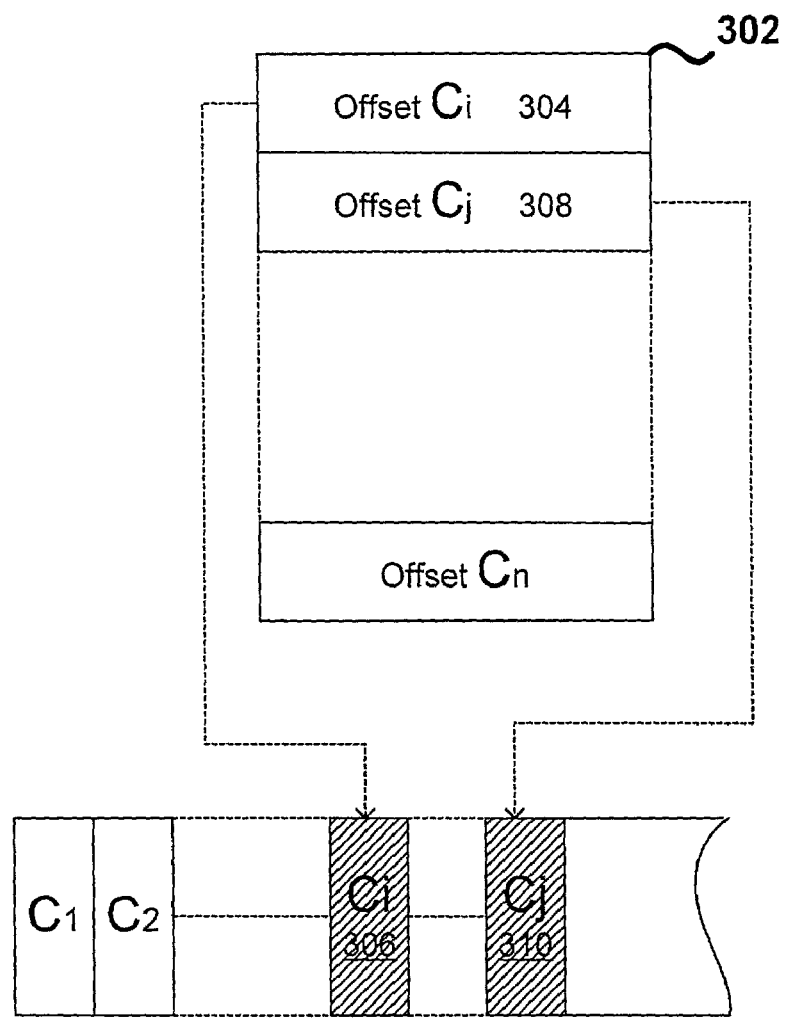
FIG. 3B illustrates a class attribute portion of a class file in accordance with one embodiment of the invention.

FIG. 3B illustrates a class attributes portion 302 of a class file 202 in accordance with one embodiment of the invention. In the described embodiment, the class attributes portion 302 is implemented as a "load-attribute" table 302. The load-attribute table 302 can include one or more entries corresponding to the marked components of the class file 202. For example, the first entry in the load-attribute table 302 is an offset $C_i$ 304 representing the offset of the component $C_i$ 306 in the class file 202. Similarly, the second entry in the load-attribute table 302 is an offset $C_j$ 308 that represents the offset of the component $C_j$ 310 in the class file 202. In this manner, the load-attribute table 302 can provide information about the components that are marked for loading.

Figure 4:
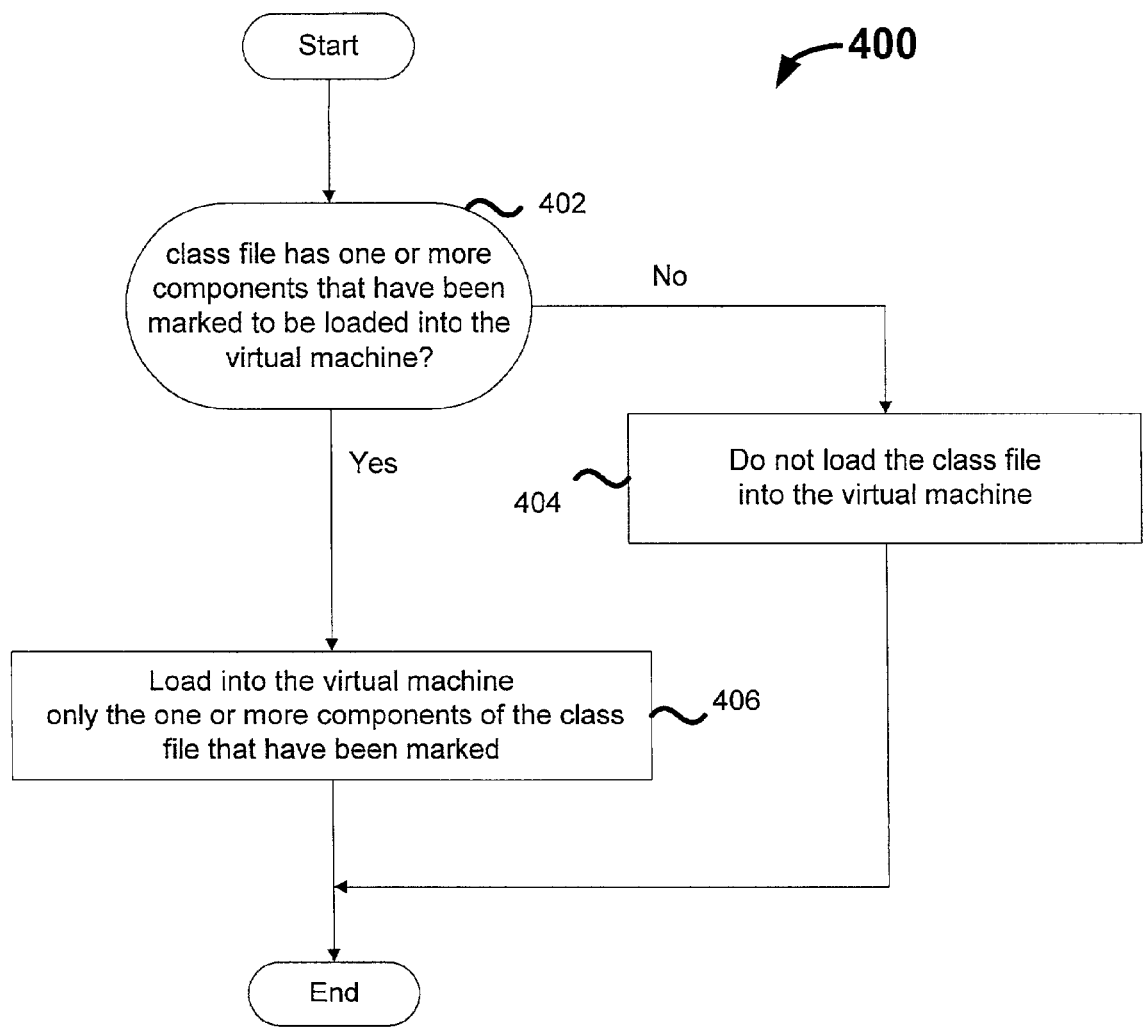
FIG. 4 illustrates a loading method for loading a class file into the virtual machine in accordance with one embodiment of the invention.

Accordingly, the load-attribute table 302 can be used to determine which components of a class file should be loaded into the virtual machine. FIG. 4 illustrates a loading method 400 for loading a class file into the virtual machine in accordance with one embodiment of the invention. The loading method 400 is suited for selectively loading various components of class files into the virtual machine. Initially, at operation 402, a determination is made as to whether one or more components of the class file have been marked for loading into the virtual machine. If it is determined at operation 402 that no component of the class file has been marked, the loading method 400 proceeds to operation 404 where the class file is not loaded into the virtual machine. In other words, the class file is effectively ignored, however, this means that the class file may be loaded later if the need arises. Thereafter, the loading method 400 ends. However, if it is determined at operation 402 that at least one component of the class file has been marked, the loading method 400 proceeds to operation 406 where the one or more components marked for loading are loaded into the virtual machine.

Figure 5:
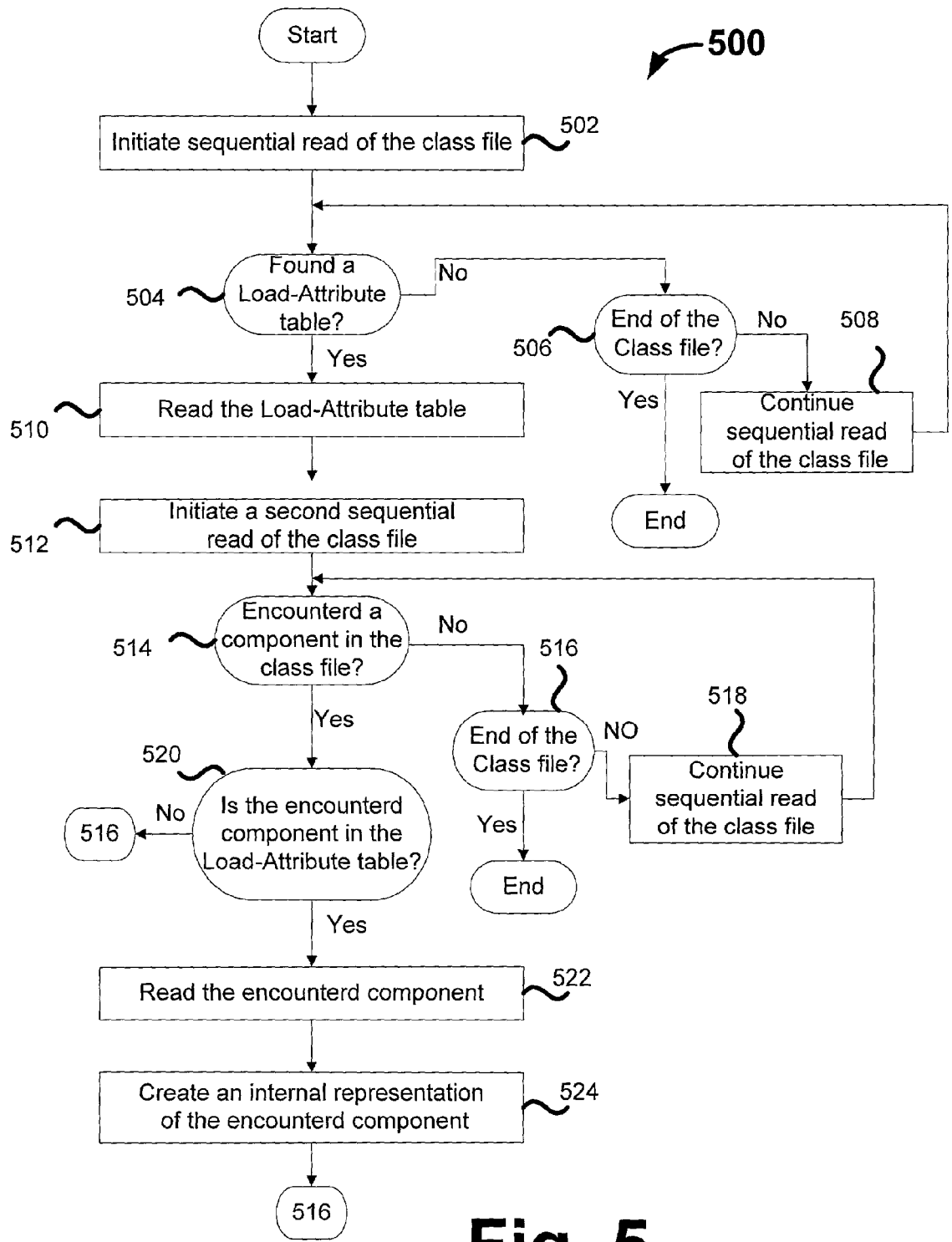
FIG. 5 illustrates in greater detail a loading method for loading a class file into the virtual machine in accordance with another embodiment of the invention.

To further elaborate, FIG. 5 illustrates in greater detail a loading method 500 for loading a class file into the virtual machine in accordance with another embodiment of the invention. At operation 502, sequential reading of the class file is initiated. The sequential reading of the class file is initiated from the beginning of the class file. Next, at operation 504, a determination is made as to whether a "load-attribute" table has been found. As noted above, the "load-attribute" table includes the information regarding the components of the class that have been marked to be loaded. If it is determined at operation 504 that the load-attribute" table has not been found, the loading method 500 proceeds to operation 506 where a determination is made as to whether the end of the class file has been reached. If it is determined at operation 506 that the end of the class file has been reached, the loading method 500 ends. However, if it is determined at operation 506 that the end of the class file has not been reached, the loading method 500 proceeds to operation 508 where the sequential read of the class file is continued. The loading method 500 then proceeds to operation 504 where a determination is made as to whether a "load-attribute" table has been found.

If it is determined at operation 504 that the "load-attribute" table has been found, the loading method 500 proceeds to operation 510 where the "load-attribute" table is read. The loading method 500 then proceeds to operation 512 where a second sequential reading of the class file is initiated. Next, at operation 514, it is determined whether a component of the class file has been encountered. If it is determined at operation 514 that a component of the class file has not been encountered, the loading method 500 proceeds to operation 516, where a determination is made as to whether the end of the class file has been reached. If it is determined at operation 516 that the end of the class file has been reached, the loading method 500 ends. However, if it is determined at operation 516 that the end of the class file has not been reached, the loading method 500 proceeds to operation 518 where the second sequential reading of the class file is continued.

When it is determined at operation 514 that a component of the class file has been encountered, the loading method 500 proceeds to operation 520 where a determination is made as to whether the encountered component of the class is in the "load-attribute" table. If it is determined that the encountered component of the class is not in the "load-attribute" table, the loading method 500 proceeds to operation 516 where it is determined whether the end of the file has been reached. Thereafter, the loading method 500 proceeds in a similar manner as described above.

However, if it is determined at operation 520 that the encountered component is in the "load-attribute" table, the encountered component is read from the class file at operation 522. Next, at operation 524, an internal representation of the component is created inside the virtual machine. The creation of the internal representation can, for example, include the operations of creating a shell and populating it in accordance with the inventions described in U.S. patent application Ser. No. 09/703,361, entitled "FRAMEWORKS FOR INVOKING METHODS IN VIRTUAL MACHINES," issued as U.S. Pat. No. 6,901,591, U.S. patent application Ser. No. 09/703,356, entitled "METHODS AND APPARATUS FOR NUMERIC CONSTANT VALUE INLINING IN VIRTUAL MACHINES," issued as U.S. Pat. No. 6,978,456, and U.S. patent application Ser. No. 09/703,449, entitled "FRAMEWORKS FOR LOADING AND EXECUTION OF OBJECT-BASED PROGRAMS," issued as U.S. Pat. No. 6,996,813.

After the creation of the internal representation at operation 524, the loading method 500 proceeds to operation 516 where a determination is made as to whether the end of the file has been reached. Thereafter, the loading method 500 proceeds in a similar manner as described above. When it is determined at operation 516 that the end of the class file has been reached, the loading method 500 ends.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for selectively loading some but not all components of a class file into a virtual machine that can execute virtual machine instructions, the class file including an attributes section and a plurality of components including virtual machine instructions that can be executed by said virtual machine, said method comprising:

checking a load-attribute in the attributes section of the class file to identify one or more selected components of said class file for loading into said virtual machine, wherein said one or more selected components have been identified in the load-attribute of the attributes section of the class file for loading into said virtual machine;

loading said one or more selected components of said class file into said virtual machine;

not loading one or mare other components of said class file into said virtual machine that are not identified for loading in the attributes section of the class file, whereby components of the class file may be selectively loaded into the virtual machine by reference to the attributes section of the class file; and wherein said load-attribute includes an attribute table in said class file, and wherein said attribute table includes one or more offsets of the one or more selected components of said class file.

2. A computer-implemented method as recited in claim 1, wherein said method further comprises:

marking one or more components of said class for loading into said virtual machine.

3. A computer-implemented method of selectively loading a class file into a virtual machine, said method comprising:

determining whether one or more components of said class file have been marked in said class file for loading into said virtual machine, wherein said marking is done by defining a load-attribute in said class file that indicates that one or more components of said class file have been selected for loading into said virtual machine, wherein said load-attribute includes an attribute table in said class file, and wherein said attribute table includes one or more offsets of the one or more selected components of said class file, and wherein said determining operates to determine whether one or more components of said class have been marked to be loaded into said virtual machine based on said load-attribute;

loading said one or more components of said class file into said virtual machine when said determining determines that said one or more components of said class file have been marked in said class file for loading into said virtual machine; and not loading one or more other components of said class when said determining determines that said other one or more components of said class have not been marked to be loaded into said virtual machine.

4. A computer-implemented method of selectively loading a class file into a virtual machine, said method comprising:

determining whether one or more components of said class file have been marked in said class file for loading into said virtual machine, wherein said marking is done by defining a load-attribute in said class file that indicates that one or more components of said class file have been selected for loading into said virtual machine, and wherein said determining operates to determine whether one or more components of said class have been marked to be loaded into said virtual machine based on said load-attribute;

loading said one or more components of said class file into said virtual machine when said determining determines that said one or more components of said class file have been marked in said class file for loading into said virtual machine;

not loading one or more other components of said class when said determining determines that said other one or more components of said class have not been marked to be loaded into said virtual machine; and wherein said load-attribute in said class file is implemented as an attribute table which includes one or more offsets of one or more components of said class file wherein said one or more offsets can be used to determine the location of said one or more components in said class file, thereby allowing said one or more components to be loaded into said virtual machine based on said one or more offsets.

5. A computer-implemented method as recited in claim 4, wherein said determining whether one or more components of said class have been marked to be loaded into said virtual machine comprises:

initiating a first sequential read of said class file; and
determining whether an attribute table has been found for said class file.

6. A computer-implemented method as recited in claim 5, wherein said method further comprises:

initiating a second sequential read of said class file;
determining, during said second sequential read, whether a component of said class file has been encountered;
and determining whether of said class file a component has a corresponding entry in said attribute table of said class file when said component has been encountered.

7. A computer readable medium for storing a class file suitable for loading into a virtual machine, said class file being associated with an object-oriented class, and said virtual machine operating in an object oriented computing system, said class file comprising:

a plurality of components;

an attribute portion that includes a load-attribute section that includes information identifying one or more of the components of said class for selective loading into the virtual machine, wherein a class loader associated with the virtual machine may reference the load-attribute portion of the class file to identify one or more selected components to be loaded into the virtual machine without loading other components of the class file into the virtual machine, whereby some but not all of the components of the class file may be loaded into the virtual machine with the components that are selected for loading into the virtual machine being identified by reference to the load-attribute portion of the class file; and wherein said load-attribute section includes an attribute table in said class file, and wherein said attribute table includes offsets of the one or more components of said class file that have been selected for loading into the virtual machine.

8. A computer readable media including computer readable code for representing a class file suitable for loading into a virtual machine, said class file being associated with an object-oriented class, and said virtual machine operating in an object-oriented computing system;

wherein said computer readable code representing said class file comprises computer readable code representing a load-attribute portion of said class file;

wherein said attribute portion represents information about one or more components of said class that have been marked to be loaded into said virtual machine; and wherein said load-attribute portion represents an attribute table, and wherein said attribute table includes one or more offsets of the one or more selected components of said class file.

9. A computer-implemented method of loading a class file into a virtual machine, said class file being associated with an object-oriented class, and said virtual machine operating in an object-oriented computing system, said method comprising:

providing a load-attribute for said class file, wherein said providing of said load-attribute operates to provide an attribute table for said class file; wherein said attribute table includes one or more offsets of one or more components, thereby associating the one or more components of said class file with said load-attribute to indicate that said one or more components of said class file are to be loaded; and loading only said one or more components of said class file into said virtual machine and not loading one more other components of said class file which have not been associated with said load-attribute.

10. A computer-implemented method as recited in claim 9, wherein said method further comprises;

determining whether at least one component at said class file has been associated with said load-attribute.

11. A computer-implemented method as recited in claim 9, wherein said determining operates to search said attribute table for an offset associated with said at least one component of said class file.

12. A computer-implemented method as recited in claim 9, wherein said determining comprises:

initiating a first sequential read of said class file to determine whether said class file has an attribute table;

reading said attribute table when said class file has an attribute table;

initiating a second read of said class file; and determining whether at least one component of said class file has been associated with said load attribution.

13. A computer-implemented method for selectively loading components of a class file into a virtual machine, wherein said class file includes a plurality of components including Bytecodes which can be loaded into and executed by said virtual machine, said method comprising:

determining whether said class file has a load-attribute, wherein said load-attribute has been defined as an attribute table for said class file, wherein said load-attribute includes an attribute table including a list of one or more selected components of said class file which has been selected for loading, and wherein said attribute table includes one or more offsets of the one or more selected components;

reading said load-attribute when said determining determines that said class file has a load-attribute; and loading into said virtual machine said one or more selected components of said class file after said reading of said load-attribute, wherein the nature of loading of said plurality of components of the class file is dictated at least in part by said reading of said load-attribute.

14. A computer-implemented method as recited in claim 13, wherein said one or more selected components of said class file are one or more methods of said class file.

15. A computer-implemented method as recited in claim 14, wherein said one or more selected components are not native methods.

16. A computer-implemented method as recited in claim 13, wherein said method further comprises:

not loading into said virtual machine one or more components of said class file which have not been listed in said load-attribute.

17. A computer-implemented method as recited in claim 16, wherein said components of the class file include a plurality of Java-based (non-native) components including methods, constant pools, and fields, and wherein at least one of said plurality of Java-based (non-native) components which have not been listed in said load-attribute is not loaded into said virtual machine.

* * * * *

UNITED STATES PATENT AND TRADEMARK OFFICE
CERTIFICATE OF CORRECTION

PATENT NO. : 7,096,466 B2 Page 1 of 1
APPLICATION NO. : 09/818096
DATED : August 22, 2006
INVENTOR(S) : Sokolov et al.

It is certified that error appears in the above-identified patent and that said Letters Patent is hereby corrected as shown below:

In the Claims:

In line 17 of claim 1 (column 7, line 27) change "or mare" to --or more--.

In line 3 of claim 10 (column 9, line 35) change "at said" to --of said--.

Signed and Sealed this

Twelfth Day of December, 2006

JON W. DUDAS
*Director of the United States Patent and Trademark Office*